United States Patent Office 3,285,991
Patented Nov. 15, 1966

3,285,991
POLYEPOXIDES CURED WITH THE REACTION PRODUCT OF A DIHYDROXYDIPHENYLSULFONE, AN AMINE, AND AN ALDEHYDE
Ralph F. Sellers, Middlebush, N.J., assignor to Union Carbide Corporation, a corporation of New York
No Drawing. Filed Mar. 26, 1963, Ser. No. 267,926
17 Claims. (Cl. 260—831)

This invention relates to polyepoxide compositions and to compounds for curing these compositions. More particularly, this invention relates to curable polyepoxide compositions, which can be easily compounded with other materials to provide compositions of desired formulation having good storage life, and from which infusible products can be obtained having excellent physical, chemical and electrical properties.

Polyepoxide compositions, such as those based on polyglycidyl ethers of polyhydric phenols having an epoxy equivalency of more than one, generally contain an aliphatic, polyfunctional amine as the curing agent, as the resultant compositions will cure to infusible products which are characterized by excellent chemical and electrical properties. The polyepoxides are usually admixed with a measured amount of an aliphatic, polyfunctional amine ranging from about 90 percent of stoichiometric to about 10 percent in excess of stoichiometric and the compositions utilized as desired, for example, as casting compositions and as coatings using conventional coating techniques, such as spraying and brushing. Because of the high reactivity of these polyfunctional amines toward the polyepoxides, however, the curing reaction commences immediately upon admixing of the two materials. Consequently, polyepoxide compositions containing these polyfunctional amines "fast cure," that is, these compositions cure to hard, tough, infusible products in a relatively short period of time.

The problem of "fast cure" has presented many obvious difficulties, since it is not always possible to use these polyexpoxide compositions immediately upon formulation. In many instances, these polyepoxide compositions cure before they can be used in the desired manner.

Various suggestions have been made for purposes of improving the relatively poor storage life of curable polyepoxide compositions. For example, it has been suggested to incorporate into the polyepoxide compositions a compound which is unreactive per se, but one which under impetus of heat will become activated and react with the polyepoxides, with the result that the compositions will cure to infusible products. Latent acting compounds, particularly of the type described, have proved to be undesirable because of the uncertainty and unpredictability of the "activation" reaction. As an illustration, a small variation in the amount of heat imparted to the compositions during the "activation" cycle can seriously affect the extent to which the "activation" reaction proceeds and, consequently, the amount of "activated" material which is formed.

In addition to premature curing, currently known polyepoxide compositions have a tendency of curing to infusible products which are characterized by undesirable surface smears and pits. Surface smears are a manifestation of exudations from the polyepoxide compositions.

The present invention provides for polyepoxide compositions, containing a reaction product of a dihydroxydiphenylsulfone, an organic amine and an organic compound containing a carbonyl group, which have good storage life, but once used in the desired manner, for instance, in molding applications, will cure to infusible products which are free of undesirable surface smears and pits. The compositions of this invention can be easily compounded with other materials to provide compositions of desired formulation having good flow characteristics in that they fill out a mold cavity into which they are charged prior to curing to unworkable products.

The curable compositions of this invention comprise a polyepoxide having an average of more than one oxirane epoxy group per molecule; and a base which is the reaction product of:
(1) A dihydroxydiphenylsulfone
(2) An organic amine having at least one aminohydrogen per molecule
(3) And an organic compound containing a carbonyl group, such as a ketone and/or an aldehyde The polyepoxides suitable for purposes of this invention are those organic compounds having an oxirane epoxy equivalency of greater than one, that is, compounds having an average of more than one oxirane epoxy group, i.e.,

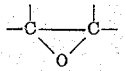

per molecule. These compounds, wherein the oxygen of the epoxy group is attached to vicinal carbon atoms, can be saturated or unsaturated, aliphatic, cycloaliphatic, or heterocyclic, and can be substituted with substituents such as halogen atoms, alkyl groups, ether groups, and the like.

In further explanation of the term "epoxy equivalency" as used in this specification, it refers to the average number of epoxy groups contained in the average polyepoxide molecule. This value is obtained by dividing the molecular weight of the polyepoxide by its calculated epoxide equivalent weight. The epoxide equivalent weight is determined by heating a one-gram sample of the polyepoxide with an excess of pyridinium chloride which is dissolved in pyridine. The excess pyridinium chloride is then back-titrated with 0.1 N sodium hydroxide to an end point using phenolphthalein as the indicator. The epoxide equivalent weight is calculated by considering that one HCl molecule is equivalent to one epoxide group. If the polyepoxide is a single compound and all of its epoxy groups are intact, the epoxy equivalency values will be integers of whole numbers, such as 2, 3, 4, and the like. In those instances wherein the polyepoxide is a mixture of polyepoxides or contains some monomeric monoepoxides or where the polyepoxide has some of its epoxy groups hydrated or otherwise reacted, the epoxy equivalency values may contain fractions, such as 1.2, 1.5, 2.5, and the like.

Illustrative of suitable polyepoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al., U.S. Patent 2,506,486 and polyphenylols such as the novolak condensates of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, the heptaphenylols described in U.S. Patent 2,885,385 to A. G. Farnham. The phenols may contain substituents such as alkyl or aryl ring substituents or halogens, as exemplified by the alkyl resorcinols, tribromoresorcinol, and the diphenols containing alkyl and halogen substituents on the aromatic ring (Bender et al., U.S. Patent 2,506,486). The polyhydric polynuclear phenols can consist of two or more phenols connected by such groups as methylene, alkylene or sulfone. The connecting groups are further exemplified by bis(p-hydroxyphenyl)methane, 2,2-bis(p-hydroxyphenyl)propane, and dihydroxydiphenysulfone.

Process for the preparation of polyglycidyl ethers of polyhydric phenols is described in detail in the Bender et al. patent (supra) and U.S. Patent 2,943,095 to A. G. Farnham et al.

Particularly desirable for purposes of this invention are the polyglycidyl ethers of the bis(hydroxyphenyl)alkanes, for example, the diglycidyl ether of 2,2-bis(p-hydroxyphenyl)propane and the diglycidyl ether of bis(p-hydroxyphenyl)methane. Other suitable polyglycidyl ethers of polyhydric phenols are enumerated in U.S. Patent 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols, and the like. (Methods of preparing polyglycidyl ethers of polyhydric alcohols are described in U.S. Patent 2,898,349 to P. Zuppinger et al.)

Other suitable polyglycidyl compounds are the polyglycidyl esters of polycarboxylic acids, such as the polyglycidyl esters of adipic acid, phthalic acid, and the like. Polyglycidyl esters of polycarboxylic acids are described in detail in U.S. Patent 2,870,170 to Payne et al. Also suitable are polyglycidyl compounds produced by reacting epichlorohydrin with aromatic amines, such as aniline, 2,6-dimethyl aniline, p-toluidine, m-chloroaniline, p-aminodiphenyl, m-phenylene diamine, p-phenylene diamine, 4,4′-diaminodiphenyl methane, or with amino phenols such as p-amino phenol, 5-amino-1-n-naphthol, 4-amino resorcinol, 2-methyl-4-amino phenol, 2-chloro-4-aminophenol, and the like. Specific compounds include, among others, N,N-diglycidyl aniline, N,N-diglycidyl-2,6-dimethyl aniline, N,N,N′,N′-tetraglycidyl-4,4′-diamino diphenyl methane, the triglycidyl derivative of p-amino phenol wherein the amino-hydrogen and OH hydrogen atoms are replaced by glycidyl groups.

Polyglycidyl derivatives of aromatic amines and amino phenols and methods for their preparation are further described in U.S. Patents 2,951,825 and 2,951,822 to N. H. Reinking and N. H. Reinking et al. respectively. The so-called peracetic acid epoxides which are obtained by epoxidation across a double bond using peracetic acid, such as bis-(2,3-epoxycyclopentyl)ether and the like are also suitable.

It is to be understood that all patents and literature references referred to in this specification are incorporated herein by reference.

As stated, the reaction products which serve as latent catalysts in accordance with the present invention are produced by utilizing as one of the reactants a dihydroxydiphenylsulfone. Exemplary of suitable dihydroxydiphenylsulfones are those having the formula:

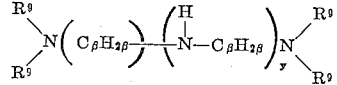

wherein each OH is in a position other than meta with respect to the $SO_2$ groups; each Y and each $Y_1$, which can be the same or different are monovalent hydrocarbon radicals such as alkyl radicals, for example, methyl, ethyl, n-butyl, n-hexyl, and the like, preferably alkyl radicals containing 1 to 6 carbon atoms inclusive; or hydroxyalkyl radicals, such as methylol, hydroxyethyl, 3-hydroxypropyl, 6-hydroxyhexyl, and the like, preferably ω hydroxyalkyl radicals containing 1 to 6 carbon atoms inclusive; or alkoxy radicals, such as methoxy, ethoxy, n-propoxy, n-amyloxy, and the like, preferably alkoxy radicals containing 1 to 6 carbon atoms inclusive; or they can be halogen atoms, i.e., chlorine, bromine, iodine, or fluorine; and z and x, which can be the same or different, are integers each of which has a value of 0 to 4 inclusive and with the further limitation that at least one position ortho or para to an OH group is unsubstituted.

Particularly desirable dihydroxydiphenylsulfones for purposes of this invention have the formula:

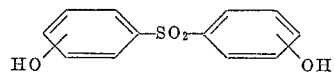

wherein each OH group is in a position other than meta with respect to the sulfone group. Illustrative of suitable sulfones are the following: 4,4′-dihydroxydiphenylsulfone, 2,4′-dihydroxydiphenylsulfone, 2-methyl-4,4′-dihydroxydiphenylsulfone, 2,2′-dimethyl-4,4′-dihydroxydiphenylsulfone, 2,6 - dimethyl-4,4′-dihydroxydiphenylsulfone, 2,6,2′-trimethyl-4,4′-dihydroxydiphenylsulfone, 2-methylol-4,4′-dihydroxydiphenylsulfone, 2,2′-dimethylol-4,4′-dihydroxydiphenylsulfone, 2,6-dimethylol-4,4′dihydroxydiphenylsulfone, 2,6,2′-trimethylol-4,4′-dihydroxydiphenylsulfone, and the like.

Exemplary of suitable monomeric organic amines are the primary and secondary amines, among which can be noted the following: methylamine, dimethylamine, ethylamine, n-propylamine, isopropylamine, n-butylamine, n-amylamine, laurylamine, n-hexylamine, allylamine, n-heptylamine, cyclopentylamine, ethylenediamine, diethylaminopropylamine, trimethylenediamine, tetramethylenediamine, pentamethylenediamine, hexamethylenediamine, ethanolamine, diethanolamine, meta - xylylenediamine, benzylamine, aniline, N-phenylethylamine, p,p′-diaminodiphenylsulfone, methylenedianiline, p,p′-diaminodiphenylmethane, o-aminoacetanilide, o-toluidine, m-toluidine, p-toluidine, o-phenylenediamine, m - phenylenediamine, p-phenylenediamine, diethylenetriamine, o-anisidine, p-anisidine, p-phenetidine, o-chloroaniline, m-chloroaniline, p-chloroaniline, p - bromoaniline, 2,4,6 - trichloroaniline, 2,4,6-tribromoaniline, benzidine hydrazine and the like. Also the polyamines, illustrated by the amines having the general formula: $R''NHR''' \; (NHR')_\alpha NH_2$ wherein R′ is a divalent alkylene radical having the formula: $-C_cH_{2c}$, wherein c is an integer from 2 to 6 and R‴ is an alkylene radical as defined for R′ or an arylene radical containing from 6 to 8 carbon atoms such as phenylene ($-C_6H_4-$), methylphenylene ($-C_6H_3-CH_3$), dimethylphenylene, ($-C_6H_2-(CH_3)_2$), xylylene $$-CH_2-C_6H_4-CH_2-$$

and the like, R″ is either hydroxyalkyl or phenyl substituted hydroxyalkyl, α is an integer from zero to three and with the provisos that when R″ represents phenyl substituted hydroxyalkyl then R‴ represents an alkylene radical, and that when R‴ represents an arylene radical, then R″ represents hydroxyalkyl and α is zero. Specific hydroxylated polyamines included by the above formula are: N-(2-phenyl-2-hydroxyethyl)diethylenetriamine, N-(2-phenyl-2-hydroxyethyl) - 1,2-diaminopropane, N-(2-phenyl-2-hydroxyethyl)dipropylenetriamine, N-hydroxyethyl-m-xylenediamine, N - hydroxyethyl - m-phenylenediamine, N-hydroxypropyl-m-phenylenediamine, and N-hydroxypropyl-2,-toluenediamine.

Other suitable amines are those having the general formula:

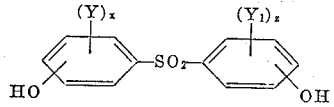

wherein y is an integer having a value of 0 to 3 inclusive, β is an integer having a value of 2 to 6 inclusive, each $R^9$, which can be the same or different, is hydrogen or hydroxyalkyl with the number of instances wherein $R^9$ is hydroxyalkyl being at least one but a whole number which is less than y+2. Among such amines can be noted N-hydroxyethylethylenediamine, N-hydroxyethyldiethylenetriamine and the like.

Particularly desirable amines are those falling within the purview of the formulas which follow:

$$R_1-\overset{H}{\underset{}{N}}-R_3$$

wherein $R_1$ is a monovalent hydrocarbon radical, generally containing a maximum of 8 carbon atoms, as for example, an alkyl radical generally containing from 1 to 8 carbon atoms inclusive and preferably containing from 1 to 3 carbon atoms inclusive, or a hydroxyalkyl radical wherein the alkyl generally contains from 1 to 8 carbon atoms inclusive and preferably contains from 1 to 3 carbon atoms inclusive; and $R_2$ is hydrogen, or a radical as defined for $R_1$;

$$H_2N(CH_2)_3O(C_nH_{2n}O)_\gamma(CH_2)_3NH_2$$

wherein $n$ is an integer having a value of 2 to 5 inclusive and $\gamma$ is an integer having a value of 1 to 11 inclusive, as for example, di(3-aminopropyl)ether of diethylene glycol, di(3-aminopropyl)ether of ethylene glycol, di-(3-aminopropyl)ether of dipropyleneglycol, and the like.

Exemplary of suitable ketones, for purposes of this invention, are those having the formula:

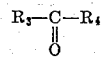

wherein $R_3$ and $R_4$, which can be the same or different, are monovalent hydrocarbon radicals each of which generally contains 1 to 6 carbon atoms inclusive. Preferred ketones are as defined wherein $R_3$ and $R_4$ are alkyl radicals containing 1 to 6 carbon atoms inclusive. Illustrative of suitable ketones falling within the scope of the formula noted are the following: saturated aliphatic ketones such as dimethyl ketone, chloroacetone, methyl ethyl ketone, methyl n-propyl ketone, diethyl ketone, ethyl isopropyl ketone, ethyl n-butyl ketone, ethyl isobutyl ketone, di-n-amyl ketone and the like; aromatic ketones such as benzophenone, and the like; unsaturated ketones such as mesityl oxide, phorone, and the like. Also suitable are such ketones as cyclohexanone, 2-methyl cyclohexanone, 3-methyl cyclohexanone, 4-methyl cyclohexanone, and the like; polyketones such as acetonyl acetone, and the like.

Aldehydes which are suitable are those having the formula:

wherein $R_5$ is hydrogen or as defined for $R_3$. Among such aldehydes can be noted formaldehyde, acetaldehyde, propionaldehyde, n-butyraldehyde, isobutyraldehyde, n-valeraldehyde, n-capraldehyde, n-heptaldehyde, stearaldehyde, acrolein, crotonaldehyde, benzaldehyde, and the like. In addition to the aldehydes falling within the scope of the above formula, also suitable are furfural, glyoxal, an the like.

In producing the bases which are admixed with polyepoxides to provide the compositions of this invention, the desired dihydroxydiphenylsulfone, amine and carbonyl containing organic compound are admixed in the following quantities:

At least about one mole of amine and at least about one mole of a carbonyl containing compound, per mole of dihydroxydiphenylsulfone.

Using such a ratio, a monosubstituted dihydroxydiphenylsulfone will be predominantly produced when using a secondary amine, as is indicated by the following equation wherein 4,4'-dihydroxydiphenylsulfone, formaldehyde and dimethylamine are illustrative reactants:

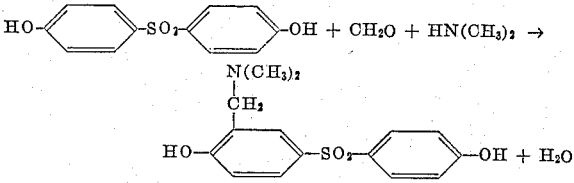

Utilizing about 2 moles of an amine and about 2 moles of a carbonyl containing compound, per mole of a dihydroxydiphenylsulfone, a disubstituted dihydroxydiphenyl-sulfone will be predominantly produced as is indicated by the following equation:

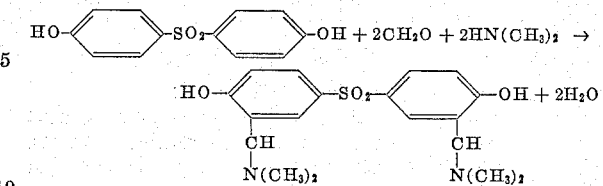

With about 3 moles of an amine and about 3 moles of a carbonyl containing compound, per mole of a dihydroxydiphenylsulfone, a trisubstituted dihydroxydiphenylsulfone will be predominantly produced as indicated by the following equation:

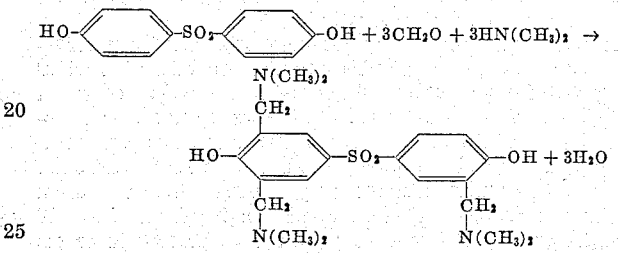

A tetra-substituted dihydroxydiphenylsulfone is produced on condensing a reaction mixture containing at least about 4 moles of an amine and at least about 4 moles of a carbonyl containing compound, per mole of dihydroxydiphenylsulfone. More than about 4 moles of an amine and more than about 4 moles of a carbonyl containing compound, per mole of dihydroxydiphenylsulfone can be used, but this is economically undesirable. The production of a tetra-substituted dihydroxydiphenylsulfone is shown graphically by the following equation:

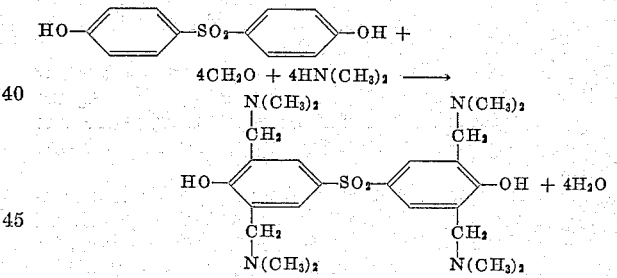

Preparation of the base, which is the reaction product of an amine, a carbonyl containing compound and a dihydroxydiphenylsulfone, is conveniently accomplished by condensing the three reactants at temperatures on the order of about 25° C. to about 100° C. under a pressure of about 25 mm. of Hg. to about 760 mm. of Hg.

Exemplary of particularly desirable bases, for purposes of this invention, are those falling within the purview of the following formula:

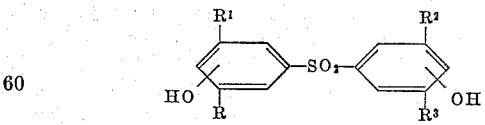

wherein each OH group is in a position other than meta with respect to $SO_2$, R, $R^1$, $R^2$ and $R^3$, which can be the same or different, are halogen; hydrogen or hydrocarbon radicals, exemplified by alkyl and hydroxyalkyl as previously defined for Y, with at least one of R, $R^1$, $R^2$ and $R^3$ being a radical of the formula:

wherein $R^4$, $R^5$, $R^6$, and $R^7$, which can be the same or different, are hydrogen or monovalent hydrocarbon radicals as defined for $R_1$, which has been previously defined.

Particularly desirable bases are the reaction products of a dihydroxydiphenylsulfone, as previously defined, a carbonyl containing compound as previously defined and an amine having the formula:

$$H_2N(CH_2)_3O(C_nH_{2n}O)_\gamma(CH_2)_3NH_2$$

wherein $n$ and $\gamma$ are as previously defined.

Various amounts of the bases, as defined, can be used to cure polyepoxide compositions to infusible products. Generally, the bases are used in catalytic amounts, that is, in amounts sufficient to catalyze the reaction of the polyepoxide compositions to infusible products. As a rule, the amounts used are from about 1 percent by weight to about 5 percent by weight, preferably about 2 percent by weight based on the weight of the polyepoxide. More than about 5 percent by weight can be used, but this is economically undesirable.

Although the polyepoxide compositions of this invention will cure to infusible products on being heated at elevated temperatures, generally on the order of about 100° C. to about 250° C., it is customary to admix therewith so-called hardeners. These hardeners are compounds which have replaceable hydrogen atoms and enter into a reaction with the polyepoxides. When utilized, hardeners are used in amounts ranging from about 80 percent of stoichiometric to about 20 percent in excess of stoichiometric, with stoichiometric amounts being preferred. For purposes of stoichiometric calculations, one epoxy group:

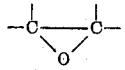

is deemed to react with one replaceable hydrogen atom. Exemplary of suitable replaceable hydrogen atoms are phenolic hydroxyl groups and carboxyl groups. Compounds containing these groups have been previously noted in this specification. (Cf. list of polyhydric compounds and polycarboxylic acids.)

The polyepoxides, the reaction products, and other desired additives are combined by simply admixing the materials together, generally at room temperature and fluxing the blend at elevated temperatures on a two-roll mill.

In those instances wherein the polyepoxide is a relatively low viscosity liquid, it is admixed directly with the reaction product. Polyepoxides which are too viscous for ready mixing with these products can be heated to reduce their viscosity or liquid solvents can be added thereto in order to provide the desired fluidity. Normally solid polyepoxides are either melted or mixed with liquid solvents.

Suitable solvents for imparting the desired fluidity to highly viscous or normally solid polyepoxides are ketones, such as acetone, methyl isobutyl ketone, isophorone, and the like; esters, such as ethyl acetate, butyl acetate, ethylene glycol monoacetate, acetate of ethylene glycol monomethyl ether, and the like; ether alcohols, such as the methyl, ethyl, and butyl ether of ethylene glycol or of diethylene glycol; chlorinated hydrocarbons, such as trichloropropane, chloroform, and the like. Also suitable in admixture with the solvents noted are the aromatic hydrocarbons, such as benzene, toluene, xylene, and the like; alcohols, such as ethyl alcohol, isopropyl alcohol, n-butyl alcohol, and the like. The actual amount of solvent used will depend upon the polyepoxide being employed. If desired, rather than using solvents of the type described, or in addition thereto, reactive liquid diluents containing a single epoxy group:

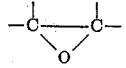

can be used in order to achieve the desired fluidity of the polyepoxide. Among such suitable reactive liquid diluents are butyl glycidyl ether, allyl glycidyl ether, phenyl glycidyl ether and the like. In determining stoichiometric amounts the presence of "reactive" diluents is taken into account.

Additional materials, such as fillers, pigments, fibers, dyes, and the like can be added to the polyepoxide compositions.

In order to cure the polyepoxide compositions of this invention to hard, tough, infusible products, it is customary to heat the compositions at elevated temperatures, preferably on the order of about 60° C. to about 200° C. for a period of time ranging from about 1 to 3 hours. The actual heating cycle will depend upon the composition being cured.

The compositions of this invention can be molded or cast into many useful articles, as for example, electrical castings and the like, and can be used to encapsulate electrical components making these components resistant to thermal and mechanical shock.

The following examples further illustrate the present invention.

EXAMPLE 1

This example illustrates the preparation of a curable polyepoxide composition containing a solid base formed from formaldehyde, dimethylamine and 4,4′-dihydroxydiphenylsulfone. This base has the formula:

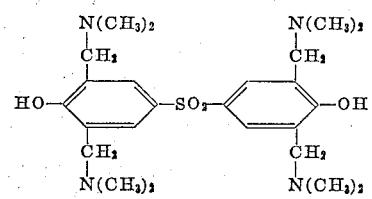

(A) *Preparation of the base.*—One thousand grams of formaldehyde, as a 37 percent aqueous solution, were slowly added to a flask, over a period of 60 minutes, which contained 2,222 grams of an aqueous solution of dimethylamine. (Concentration, 25 percent by weight dimethylamine.) During the addition of formaldehyde, the contents of the flask were agitated and kept at a temperature below 30° C. After the addition of formaldehyde had been completed, the mixture in the flask was stirred for 2 hours while being maintained at a temperature of 25° C. to 30° C. One thousand forty-four grams of the mixture, so produced, and 250 grams of 4,4′-dihydroxydiphenylsulfone were charged into a 3,000 ml. round bottom flask which was fitted with an agitator, thermometer and a condenser. The mixture was heated slowly to reflux, under atmospheric pressure, and heated at reflux for 2 hours. The reflux temperature started at 90° C. and increased to 100° C. during the two-hour period. At the end of the two-hour period, the condenser was arranged for distillation and the contents in the flask distilled to a pot temperature of 120° C. under a pressure of 50 mm. of Hg. The hot residue recovered, in an amount of 447 grams, was a wine-colored, molten mass which became a brittle solid when cooled to about 25° C.

(B) *Preparation of a curable polyepoxide composition hereinafter referred to as Composition A.*—A homogeneous composition was prepared by dry-blending the following materials: 2 parts by weight of the base of 1A, 100 parts by weight of an epoxidized novolak having an epoxide equivalent weight of 200, 50 parts by weight of a phenolic resin, 5 parts by weight calcium stearate, the calcium stearate acting as a mold-release agent, and 250 parts by weight of powdered silica. Portions of the homogeneous composition were fluxed on a two-roll mill whose front roll was at a temperature of 110° C. and whose rear roll was at a temperature of 165° C. The compounded composition was sheeted off the two-roll mill, cooled to room temperature and ground to about a 16 mesh particle size.

The novolak, having an average molecular weight of 600, was prepared by condensing 100 parts by weight of phenol with 72 parts by weight of a 37 percent aqueous formalin solution in the presence of a catalytic amount of oxalic acid. The condensate was dehydrated to a solid product which was ground into a powder. The novolak was fed to a still which contained ethyl alcohol and a quantity of epichlorohydrin in excess of the stoichiometric amount. The mixture was heated to a temperature of between 60° C. and 65° C. and held at this temperature until all of the novolak resin had dissolved. A controlled amount of caustic soda was then added to the mix whereby the epichlorohydrin and novolak reacted to form the corresponding chlorohydrin ether. The chlorohydrin ether was dehydrochlorinated by the addition thereto of a stoichiometric amount of sodium hydroxide whereby the epoxidized novolak product was obtained.

The phenolic resin which was used as hardener for the polyepoxide was a solid, grindable novolak resin having a molecular weight of about 650 and was prepared by condensing 100 parts by weight of phenol with 73 parts by weight of a 37 percent aqueous formalin solution in the presence of a catalytic amount of oxalic acid. The condensate was neutralized with lime, with the water being distilled off.

In a like manner, an equivalent amount of acetone can be used in place of formaldehyde to produce a base which can be used as a catalyst.

EXAMPLE 2

This example illustrates the preparation of a curable polyepoxide composition containing a base formed for formaldehyde, diethanolamine and 4,4' - dihydroxydiphenylsulfone. This base has the formula:

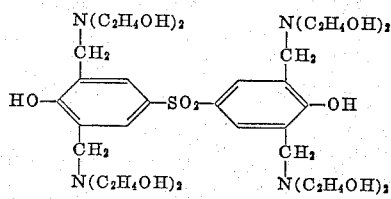

(A) *Preparation of the base.*—In a manner identical to that described in Example 1, 1,377 grams of formaldehyde (37%) were admixed with 1,785 grams of diethanolamine and 744 grams of this mixture added to 250 grams of 4,4'-dihydroxydiphenylsulfone. The resultant mixture was then reacted in a manner as described in Example 1. The product recovered, in an amount of 730 grams, having the formula noted above, was a wine-colored, viscous liquid.

(B) *Preparation of a curable polyepoxide composition hereinafter referred to as Composition B.*—Composition B was prepared in a manner as described for the preparation of Composition A with the exception that 2 parts by weight of the base described in Example 2A was used in place of the base described in Example 1A.

EXAMPLE 3

This example illustrates the preparation of a curable polyepoxide composition containing a solid base formed from formaldehyde, N-methylethanolamine and 4,4'-dihydroxydiphenylsulfone. This base has the formula:

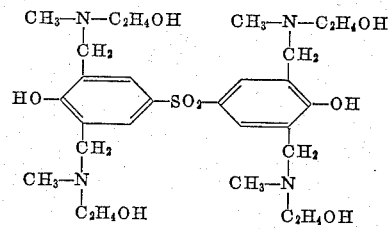

(A) *Preparation of the base.*—In a manner identical to that described in Example 1, 1,620 grams of formaldehyde (37%) were admixed with 1,500 grams of N-methylethanolamine and to 624 grams of this mixture, there was added 250 grams of 4,4'-dihydroxydiphenylsulfone. The resultant mixture was then reacted in a manner as described in Example 1. The product recovered, in an amount of 574 grams, having the formula noted-above, was a wine-colored, friable solid.

(B) *Preparation of a curable polyepoxide composition hereinafter referred to as Composition C.*—Composition C was prepared in a manner as described for the preparation of Composition A with the exception that 2 parts by weight of the base described in Example 3A were used in place of the base described in Example 1A.

EXAMPLE 4

This example illustrates the preparation of a curable polyepoxide composition containing a solid base formed from formaldehyde, dimethylamine and a sulfone made up of 80 percent by weight 4,4'-dihydroxydiphenylsulfone and 20 percent by weight 2,4'-dihydroxyldiphenylsulfone. The base was made up of a mixture of compounds having the formula:

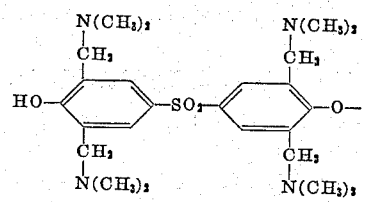

and

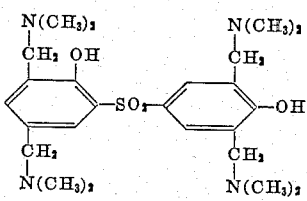

(A) *Preparation of the base.*—In a manner identical to that described in Example 1, 1,000 grams of formaldehyde (37%) were admixed with 2,222 grams of an aqueous solution of dimethylamine (concentration, 25% by weight dimethylamine) and to 1,044 grams of the resultant mixture there was added 250 grams of a sulfone, which was previously described. The product recovered, in an amount of 464 grams, was a grindable, yellow-colored solid.

(B) *Preparation of a curable polyepoxide composition hereinafter referred to as Composition D.*—Composition D was prepared in a manner as described for the preparation of Composition A with the exception that 2 parts by weight of the base described in Example 4A were used in place of the base described in Example 1A.

EXAMPLE 5

This example illustrates the preparation of a curable polyepoxide composition containing a solid base formed from formaldehyde, diethylamine and 4,4'-dihydroxydiphenylsulfone. This base has the formula:

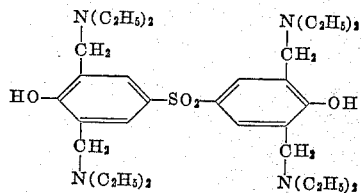

(A) *Preparation of the base.*—In a manner identical to that described in Example 1, 300 grams of formaldehyde (40%) were admixed with 1,168 grams of an aqueous solution of diethylamine and to this mixture there was added 250 grams of 4,4'-dihydroxydiphenylsulfone. The resultant mixture was reacted in a manner as described in Example 1. The product recovered in an amount of 450 grams, was a brittle, amber-colored solid.

(B) *Preparation of a curable polyepoxide composition hereinafter referred to as Composition E.*—A homogeneous composition was formed by dry blending the following materials: 90 parts by weight of an epoxidized novolak (described in Example 1), 10 parts by weight of a polyglycidyl ether of 2,2-bis(p-hydroxyphenyl)propane having an epoxide equivalent weight of 1,600, 39 parts by weight of a phenolic resin (described in Example 1), 5 parts by weight of calcium stearate, 97 parts by weight powdered silica and 2 parts by weight of the base of 5A. The composition was then fluxed on a two-roll mill and rolled for 60 seconds with the front roll at 110° C. and no heat applied to the back roll. The composition was cut from the front roll into a sheet, was allowed to cool, and the composition was ground to approximately 16 mesh.

EXAMPLE 6

This example illustrates the preparation of a base from 4,4'-dihydroxydiphenylsulfone, formaldehyde and di(3-amino-propyl)ether of diethylene gylcol having the formula:

$$H_2N(CH_2)_3O(CH_2CH_2O)_2(CH_2)_3NH_2$$

This base has the formula:

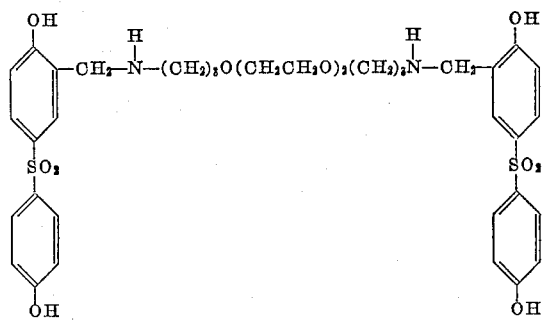

To a solution of 250 grams of 4,4'-dihydroxydiphenylsulfone, 250 grams of water and 110 grams of di(3-amino-propyl)ether of diethylene glycol, there was added 81.1 grams of formaldehyde (37%) over a 10 minute period. During the addition of the formaldehyde, the temperature of the reaction mixture rose to 50° C. The reaction mixture was then distilled to a pot temperature of 110° C. under atmospheric pressure. At this point, the pressure under which the reaction mixture was being distilled was reduced gradually, over a period of 45 minutes, to about 25 mm. of Hg., at the end of which time the pot temperature was 150° C. The product recovered, having the formula noted above, was a grindable, yellow-colored solid.

(B) *Preparation of a curable polyepoxide composition hereinafter referred to as Composition F.*—Composition F was prepared in a manner as described for the preparation of Composition E with the exception that 2 parts by weight of the base described in Example 6A were used in place of the base described in 5A.

EXAMPLE 7

Various bases were prepared and used in the formulation of curable polyepoxide compositions. The procedure used to prepare each base was the same as that used in Example 1A. The reactants and amounts thereof are tabulated below.

7(I)

640 grams of formaldehyde (40%)
1,535 grams of an aqueous solution of dimethylamine (concentration, 25 percent by weight dimethylamine)
To 183 grams of this mixture were added 100 grams of 3,3'-dimethyl-4,4'-dihydroxydiphenylsulfone.
Formula of the base:

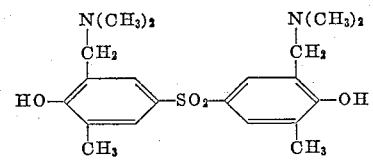

Amount of base recovered, 139 grams.
Characteristics of base, brown-colored solid, melting at 88° C.

7(II)

153 grams of the formaldehyde-dimethylamine mixture described in 7(I)
150 grams of 4,4'-dihydroxydiphenylsulfone
Formua of the base:

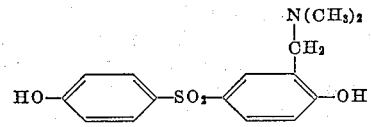

Amount of base recovered, 180 grams.
Characteristics of base, brown-colored solid, melting at 134° C.

7(III)

204 grams of the formaldehyde-dimethylamine mixture described in 7(I)
100 grams of 4,4'-dihydroxydiphenylsulfone
Formula of the base:

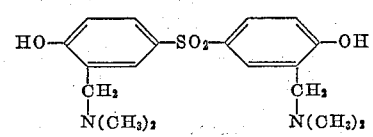

Amount of base recovered, 141 grams.
Characteristics of base, wine-colored solid, having a melting point of 105° C.

7(IV)

306 grams of the formaldehyde-dimethylamine mixture described in 7(I)
100 grams of 4,4'-dihydroxydiphenylsulfone
Formula of the base:

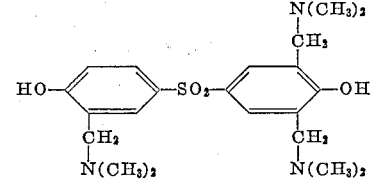

Amount of base recovered, 158 grams.
Characteristics of the base, brownish-red-colored solid, melting at 81° C.

7(V)

612 grams of the formaldehyde-dimethylamine mixture described in 7(I)
150 grams of 4,4'-dihydroxydiphenylsulfone
Formula of the base:

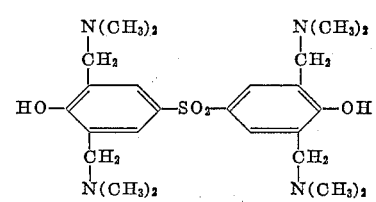

Amount of base recovered, 266 grams.

Characteristics of base, reddish-brown-colored solid having a melting point of 65° C.

*Composition G.*—Same as Composition F with the exception that 2 parts by weight of the base described in 7(I) were used in place of the base described in 6A.

*Composition H.*—Same as Composition F with the exception that 2 parts by weight of the base described in 7(II) were used in place of the base described in 6A.

*Composition I.*—Same as Composition F with the exception that 2 parts by weight of the base described in 7(III) were used in place of the base described in 6A.

*Composition J.*—Same as Composition F with the exception that 2 parts by weight of the base described in 7(IV) were used in lieu of the base described in 6A.

*Composition K.*—Same as Composition F with the exception that 2 parts by weight of the base described in 7(V) were used in lieu of the base described in 6A.

Polyepoxide compositions of this invention not only have excellent storage life but also cure rapidly to infusible products on being heated at temperatures previously noted. In order to more fully illustrate the satisfactory cure speeds of the polyepoxide compositions of this invention, cure speeds of such compositions were determined by the Apparent Modulus of Elasticity Test.

This test consists in molding a bar of material having dimensions of 1 inch by ⅛ inch and 5 inches under a molding pressure of 2,000 p.s.i., at a temperature of 168° C. and a cure time of from 2 to 4 minutes. The bar is maintained at the molding temperature and a load placed at the middle of the bar.

The Apparent Modulus of Elasticity (E) is calculated from the expression:

$$E = \frac{Fl^3}{4 \cdot D \cdot W \cdot T}$$

where F is the applied load in pounds; $l$ is the length of the span under stress expressed in inches; D is the deflection in inches; W and T are the width and thickness of the bar, respectively, in inches.

A material which cures rapidly to an infusible, unworkable product has less deflection and consequently a larger (E) value.

A composition having a value for (E) of at least about 18,000 pounds per square inch for a cure time of 2 minutes is deemed to have a satisfactory cure speed.

| Compositions | Molding Temperature in ° C. | Length of Molding Cycle in Minutes |
|---|---|---|
| Composition A | 168 | 2 |
| Composition C | 168 | 2 |
| Composition D | 168 | 2 |
| Composition G | 168 | 2 |
| Composition H | 168 | 2 |
| Composition I | 168 | 2 |
| Composition J | 168 | 2 |

None of the molded bars exhibited surface smear.

For purposes of comparison a composition, hereinafter referred to as Control I, was prepared in a manner as described for the preparation of Composition A, using the following materials: 90 parts by weight of an epoxidized novolak (described in Example 1), 10 parts by weight of a phenolic resin (described in Example 1), 2 parts by weight of tris(dimethylaminomethyl)phenol, 5 parts by weight of calcium stearate and 97 parts by weight of powdered silica. Bars were molded from this composition in a manner as described in the Apparent Modulus of Elasticity Test. The bars molded from Control I were characterized by considerable surface smear.

What is claimed is:

1. A curable polyepoxide composition comprising a polyepoxide having an oxirane epoxy equivalency of greater than one, a hardener for said polyepoxide, and a catalytic amount of a base having the formula:

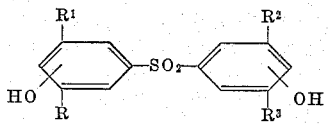

wherein each OH group is in a position other than meta with respect to $SO_2$, R, $R^1$, $R^2$, and $R^3$ are selected from the group consisting of halogen, hydrogen, a monovalent hydrocarbon radical and a radical of the formula:

with the further limitation that at least one of said R, $R^1$, $R^2$ and $R^3$ is a radical of the above formula, wherein $R^4$, $R^5$, $R^6$ and $R^7$ are selected from the group consisting of hydrogen, monovalent hydrocarbon radicals and monovalent hydrocarbon radicals having as a substituent thereon a radical of the formula:

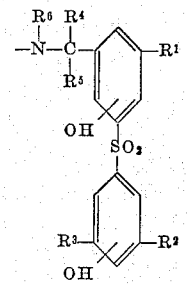

wherein $R^1$–$R^6$ are as previously defined and the position of each OH is as previously defined.

2. The cured product of the composition defined in claim 1.

3. A curable composition as defined in claim 1 wherein said polyepoxide is a polyglycidyl ether of a polyhydric phenol.

4. A curable composition as defined in claim 1 wherein said base is present in an amount of about 1 percent by weight to about 5 percent by weight, based on the weight of said polyepoxide.

5. A curable composition as defined in claim 1 wherein the said polyepoxide is diglycidylether of 2,2-bis(p-hydroxyphenyl)propane.

6. A curable composition as defined in claim 1 wherein the said base is formed from a dihydroxydiphenylsulfone, an organic amine and an organic compound containing a carbonyl group and wherein the said dihydroxydiphenylsulfone is 4,4'-dihydroxydiphenylsulfone.

7. A curable composition as defined in claim 1 wherein the said base is formed from a dihydroxydiphenylsulfone, an organic amine and an organic compound containing a carbonyl group and wherein the said dihydroxydiphenylsulfone is 2,4'-dihydroxydiphenylsulfone.

8. A curable composition as defined in claim 1 wherein the said base is formed from a dihydroxydiphenylsulfone, an organic amine and an organic compound containing a carbonyl group and wherein the said dihydroxydiphenylsulfone is 3,3'-dimethyl-4,4'-dihydroxydiphenylsulfone.

9. A curable composition as defined in claim 1 wherein the said base is formed from a dihydroxydiphenylsulfone, an organic amine and an organic compound containing a carbonyl group and wherein the said organic compound containing a carbonyl group is formaldehyde.

10. A curable composition as defined in claim 1 wherein the said base is formed from a dihydroxydiphenylsulfone, an organic amine and an organic compound containing a carbonyl group and wherein the said organic compound containing a carbonyl group is acetone.

11. A curable composition as defined in claim 1 wherein the said base is formed from a dihydroxydiphenylsulfone, an organic amine and an organic compound containing a carbonyl group and wherein the said amine is dimethylamine.

12. A curable composition as defined in claim 1 wherein the said base is formed from a dihydroxydiphenylsulfone, an organic amine and an organic compound containing a carbonyl group and wherein the said amine is diethanolamine.

13. A curable composition as defined in claim 1 wherein the said base is formed from a dihydroxydiphenylsulfone, an organic amine and an organic compound containing a carbonyl group and wherein the said amine is N-methylethanolamine.

14. A curable composition as defined in claim 1 wherein the said base is formed from a dihydroxydiphenylsulfone, an organic amine and an organic compound containing a carbonyl group and wherein the said amine is diethylamine.

15. A curable composition as defined in claim 1 wherein the said base is formed from a dihydroxydiphenylsulfone, an organic amine and an organic compound containing a carbonyl group and wherein the said amine is di(3-aminopropyl)ether of diethylene glycol.

16. A curable composition as defined in claim 1 wherein said base is present in an amount of about 2 percent by weight based on the weight of said polyepoxide.

17. The cured product of the composition defined in claim 16.

No references cited.

MURRAY TILLMAN *Primary Examiner.*

P. LIEBERMAN, *Assistant Examiner.*